United States Patent
Niemelä

(10) Patent No.: US 11,030,309 B2
(45) Date of Patent: Jun. 8, 2021

(54) THREAT DETECTION SYSTEM

(71) Applicant: F-Secure Corporation, Helsinki (FI)

(72) Inventor: Jarno Niemelä, Kirkkonummi (FI)

(73) Assignee: F-Secure Corporation, Helsinki (FI)

( * ) Notice: Subject to any disclaimer, the term of this patent is extended or adjusted under 35 U.S.C. 154(b) by 301 days.

(21) Appl. No.: 16/223,525

(22) Filed: Dec. 18, 2018

(65) Prior Publication Data

US 2019/0188377 A1 Jun. 20, 2019

(30) Foreign Application Priority Data

Dec. 20, 2017 (GB) ..................................... 1721378

(51) Int. Cl.
*G06F 21/55* (2013.01)
*G06F 21/57* (2013.01)

(52) U.S. Cl.
CPC .......... *G06F 21/552* (2013.01); *G06F 21/577* (2013.01); *G06F 2221/034* (2013.01)

(58) Field of Classification Search
CPC ................. G06F 21/552; G06F 21/577; G06F 2221/034; G06F 21/55; G06F 21/566
See application file for complete search history.

(56) References Cited

U.S. PATENT DOCUMENTS

| | | | | |
|---|---|---|---|---|
| 2010/0011029 | A1* | 1/2010 | Niemela | H04L 63/145 707/E17.044 |
| 2010/0024035 | A1* | 1/2010 | Wallace | G06F 21/577 726/25 |
| 2017/0286688 | A1 | 10/2017 | Ionescu et al. | |
| 2017/0353481 | A1* | 12/2017 | Kong | H04L 63/145 |
| 2019/0065736 | A1* | 2/2019 | Dharmadhikari | G06F 21/55 |

OTHER PUBLICATIONS

Wikipedia.org, "Intrusion Detection System", Jun. 15, 2018, 10 pgs.

* cited by examiner

*Primary Examiner* — Meng Li
(74) *Attorney, Agent, or Firm* — Harrington & Smith

(57) ABSTRACT

There is provided a method of detecting a threat against a computer system. The method comprises: creating a modular representation of behavior of known applications on the basis of sub-components of a set of known applications; entering the modular representation to an evolutionary analysis system for generating previously unknown combinations of the procedures; storing the generated previously unknown combinations as candidate descendants of known applications to a future threat candidate database; monitoring the behavior of the computer system to detect one or more procedures matching the behavior of a stored candidate descendant in the future threat candidate database; and upon detection of one or more procedures matching the behavior of the stored candidate descendant and if the stored candidate descendant is determined to be malicious or suspicious, identifying the running application as malicious or suspicious.

19 Claims, 3 Drawing Sheets

THREAT DETECTION SYSTEM

FIELD OF THE INVENTION

The present invention relates to the detection of malware on a computer system.

BACKGROUND

The term "malware" is short for malicious software and is used to refer to any software designed to infiltrate or damage a computer system without the owner's informed consent. Malware can include viruses, worms, Trojan horses, rootkits, adware, spyware and any other malicious and unwented software. Many computer devices and computer systems, such as desktop personal computers (PCs), laptops, personal data assistants (PDAs) and mobile phones can be at risk from malware.

Traditional malware and threat detection relies on having seen malware samples and having analysed them. As current malware analysis relies on malware already existing and intrusion detection on identifying known patterns, methods allowing analysis of malware that does not yet exist and prediction of their behaviour are needed. It would be very beneficial to enable detection of previously unknown threats and thus be ready to provide protection against them even before the malware exists.

SUMMARY

In an example aspect of the invention, there is an apparatus, such as a computer system apparatus, comprising: at least one processor; and at least one memory including computer program code, where the at least one memory and the computer program code are configured, with the at least one processor, to cause the apparatus to at least perform: detecting a threat against a computer system, including analysing the computer system to find any at least one of applications or services exhibiting common vulnerability types and misconfigurations known to exist, monitoring installation and normal operation of such found at least one of applications or services of the analysed computer system that are detected to exhibit said at least one of vulnerability types or misconfigurations, creating and storing representations of expected behaviors of the monitored at least one of applications or services on the basis of the monitoring, monitoring the behavior of the computer system to detect one or more procedures of the monitored at least one of applications or services that do not match the expected behaviors of the monitored at least one of applications or services; and upon detection of one or more procedures not matching the expected behaviors of the monitored at least one of applications or services, identifying said at least one of applications or services as malicious or suspicious.

In another example aspect of the invention, there is a method comprising: detecting a threat against a computer system, including analysing the computer system to find any at least one of applications or services exhibiting common vulnerability types and misconfigurations known to exist, monitoring installation and normal operation of such found at least one of applications or services of the analysed computer system that are detected to exhibit said at least one of vulnerability types or misconfigurations, creating and storing representations of expected behaviors of the monitored at least one of applications or services on the basis of the monitoring, monitoring the behavior of the computer system to detect one or more procedures of the monitored at least one of applications or services that do not match the expected behaviors of the monitored at least one of applications or services; and upon detection of one or more procedures not matching the expected behaviors of the monitored at least one of applications or services, identifying said at least one of applications or services as malicious or suspicious.

A further example embodiment is an apparatus and a method of the previous paragraphs, wherein there is determining said common vulnerability types and misconfigurations against the computer system by analysis and/or by receiving external security data feed having information on said common vulnerability types and misconfigurations, wherein there is storing any found at least one of applications or services of the analysed computer system that are detected to exhibit said at least one of vulnerability types or misconfigurations in a database, wherein upon detection of one or more procedures not matching the expected behaviours, the method further comprises analysing whether the detected one or more procedures match activities that are required to exploit said at least one of vulnerability types or misconfigurations and deter mining the severity of maliciousness of said at least one of applications or services on the basis of the result of the analysis, wherein each procedure of the one or more procedures of the monitored at least one of applications or services is identified by a characteristic action and one or more expected actions, wherein the characteristic and/or expected actions include one or more of: API calls and/or API call parameters made by the running application, information made available to plugins of the running application, actions relating to browser extensions, file access operations performed by the running application, network operations performed by the running application, encrypted communications sent by the running application, error conditions relating to the running application, wherein said procedures include any one or more of: establishment of a secure session, communication over a secure session, file operations, registry operations, memory operations, network operations, wherein there is, upon identifying said at least one of applications or services as malicious or suspicious, handling the at least one of applications or services by one or more of: terminating a process of the at least one of applications or services, terminating the characteristic action or an action resulting from the characteristic action, removing or otherwise making safe the at least one of applications or services and performing a further malware scan on the at least one of applications or services, wherein upon identifying the at least one of applications or services as malicious or suspicious, further comprising at least one of: sending from a client computer to a server details of the characteristic action and other actions taken on the client computer, wherein there is sending from the server to client computer an indication as to whether or not the at least one of applications or services is malicious or suspicious, and wherein there is sending from the server to the client computer instructions for handling the at least one of applications or services; prompting the client computer to kill and/or remove the at least one of applications or services; storing information indicating the at least one of applications or services.

DETAILED DESCRIPTION

In order to provide improved detection of malware and threats that are not yet known, a system is proposed which makes use of behaviour profiles generated for a plurality of known applications/services. In various embodiments of the invention, detection of previously unknown malware is enabled.

Traditionally protection against exploits may be based on searching vulnerabilities that are known. In the past, attackers have also relied same kind of methods, that is, searching for known vulnerabilities and then searching for exploits that can be used for said vulnerabilities. Thus, the exploited software has been limited to major software vendors and the defenders have been able to rely on the fact that vulnerabilities will be found and thus be reported by software. However, more advance attackers have started to search for common mistakes and misconfigurations in more rare third party software, for example. This means that when an attacker invades a computer system, he will analyse the local system and use any misconfiguration that can be found, in many cases this includes vulnerabilities that have not been found before. A typical example of this kind of attack is scanning for privileged system services for unquoted service path vulnerability using a suitable toolkit, such as PowerSploit, and then using any vulnerable service that can be found. When the service paths are unquoted and contain spaces within the path, they can be exploited.

Thus, one purpose of the present invention is to detect malicious behaviour also in very early stages of the activity and before malicious actions can cause any real damage. For example, having evaluated common vulnerability types and misconfigurations in the protected systems and monitoring applications exhibiting said vulnerabilities, it is possible to block the activities before actual harm-causing steps are performed by them. The proposed solution has many benefits, such as providing early detection and stopping execution prior to malicious actions, and understanding the lineage of the threat in an automated manner providing significant benefits to threat intelligence through providing detailed information.

Further, previously known behavioural monitoring solutions are very false alarm prone. One benefit of the present invention is that it reduces false alarms and enables more decisive actions in cases where known vulnerable service or application exhibits behavioural anomalies. This is possible because embodiments of the present invention combine vulnerability data and behavioural profiling in a new and effective way.

Figure 1:
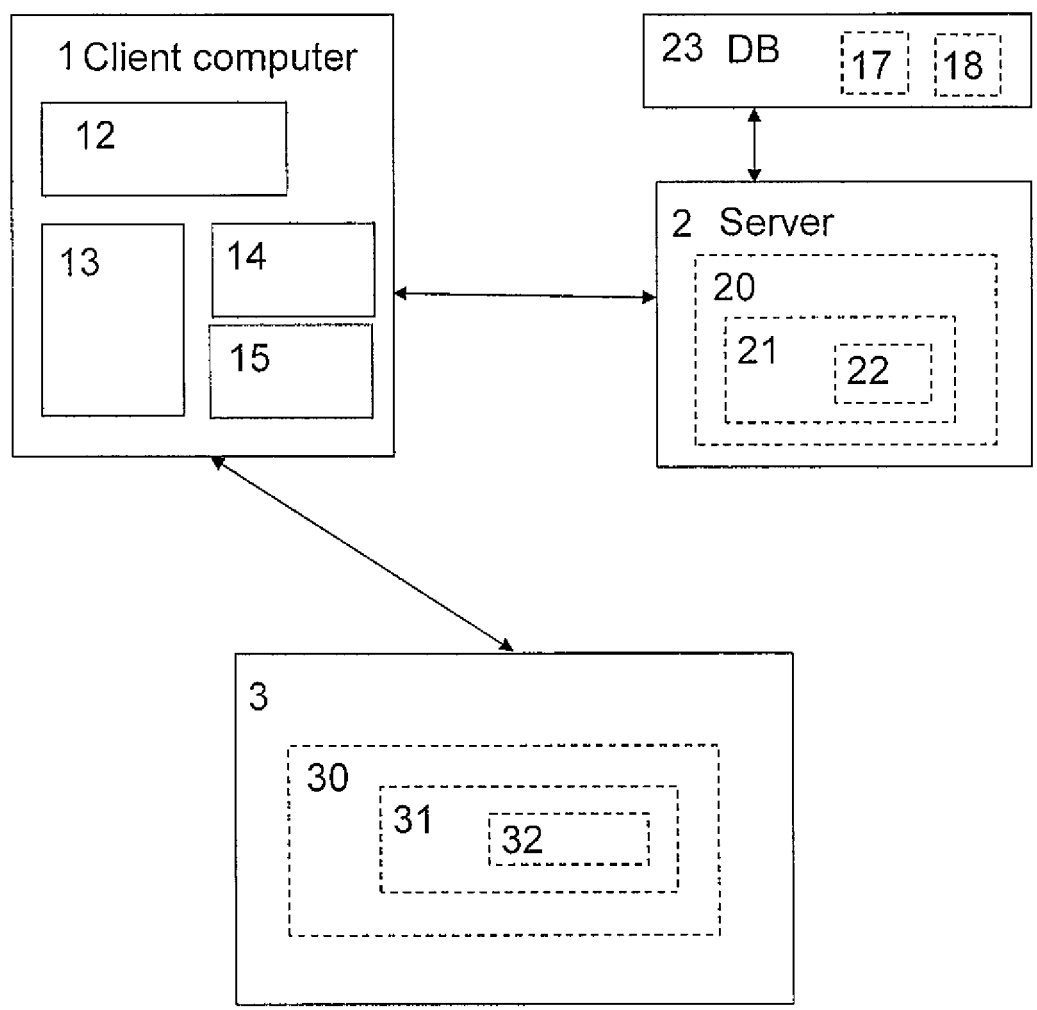
FIG. 1 is a schematic diagram of a system.

An example schematic diagram of a system according to the invention will be described with reference to FIG. 1. A client computer 1 has installed thereon a security application 14 provided by a security service provider. The computer runs a number of further applications, and the security application 14 monitors actions taken by those further applications. The client computer 1 may connect to a server 2, and the security application 14 sends results of the monitoring to the server 2 for analysis, or the analysis may be performed at the client computer 1 by the security application. Data 17 relating to applications or services may be stored in a database 23. Application behaviour profiles/representations of behaviours 18 of applications/services may be constructed at the client 1 by the security application 14, at the server 2, and/or at a second server 3 and be stored in a database 23. The client computer 1 and the servers 2 and 3 each typically comprise a hard drive 12, 20, 30, a processor 13, 21, 31, and RAM 15, 22, 32. The client computer 1 may connect to the servers 2 and 3 over the Internet, or any suitable network. The servers 2 and 3 (If used) are operated by the security service provider.

Figure 2:
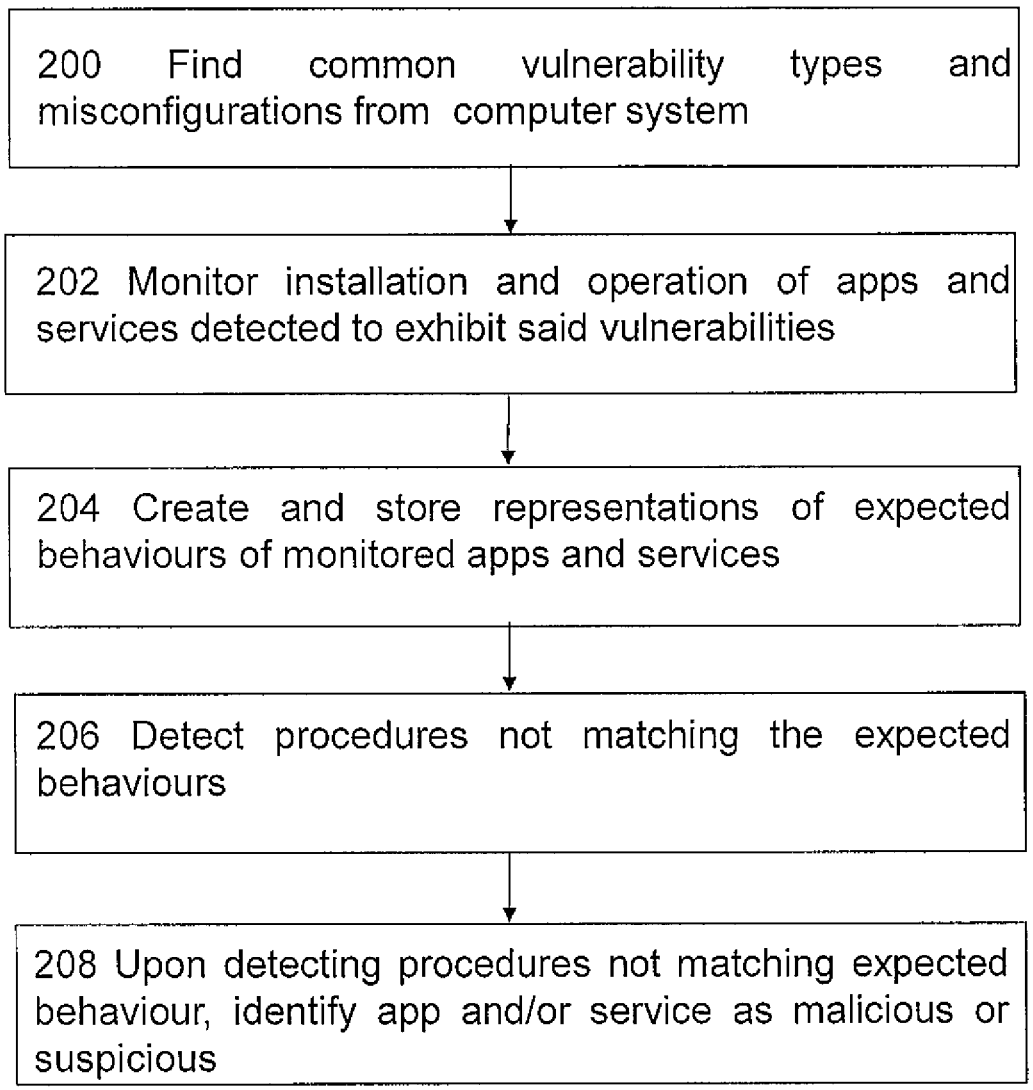
FIG. 2 is a flowchart of a malware protection method according to an embodiment.

FIG. 2 is a flowchart of a method of detecting malware according to an embodiment.

In 200, the security application analyses the computer system 1 to find any applications and/or services exhibiting common vulnerability types and misconfigurations known to exist. The common vulnerability types and misconfigurations against the computer system may be determined based on analysis and/or by receiving external security data feed having information on said vulnerabilities/misconfigurations. In an embodiment, it is possible to scan for the common misconfigurations by using a security product, such as a Rapid Detection Service (RDS) or get a feed from an internal or external vulnerability scanner. Any suitable tool may be used to run the analysis, such as PowerSploit.

In 202, installation and normal operation of such found applications and services of the analysed computer system that are detected to exhibit said vulnerability types and/or misconfigurations are monitored by the security application.

In 204, the security application creates and stores representations of the behaviour of the monitored applications and services on the basis of the monitoring. In an embodiment, the representations may be created based on sub-components of the monitored applications. Each sub-component identifies one or more procedures known to be performed by the applications. For each such application, the security application may also maintain identification information for the application such as filenames, hash data, certificates, etc. The security application may further maintain a behaviour profile for each of the monitored applications. The behaviour profile for an application identifies how the application implements one or more procedures, for example how an SSL or other secure connection is established, how the application edits registry entries, or any other operation such as file access, network access or memory related operations. The profile identifies, for each procedure, a characteristic action (which will typically be the action which is the result of the procedure) and one or more expected actions. For example, in the case of an SSL connection, the characteristic action may be the sending of an SSL encrypted message, and the expected actions may include a call to a library which provides an SSL implementation.

As a further example, the characteristic action may be the editing of a registry entry. The API used to perform this action will generally be the same regardless of implementation, but there is a detectable difference in the actions preceding the registry edit depending on the programming language in which the code is written, and possibly on the compiler used. The actions may be anything which is done by the application or other software or hardware on the computer system as part of the procedure. The procedures may include file, registry, memory, and/or network operations.

Once a representation of expected behaviour of a monitored application or service has been created, it is stored in a database.

In 206, the behaviour of the computer system is monitored to detect one or more procedures of the monitored applications and/or services that do not match the expected behaviours of the monitored applications and services. The security application will monitor behaviour (e.g. one or more procedures) of the monitored applications and services and compare the detected behaviour with the representation of expected behaviour of the monitored application or service that has been stored in the database.

In 208, upon detection of one or more procedures not matching the behaviors of the monitored applications and services, the running application and/or service is identified as malicious or suspicious.

Figure 3:
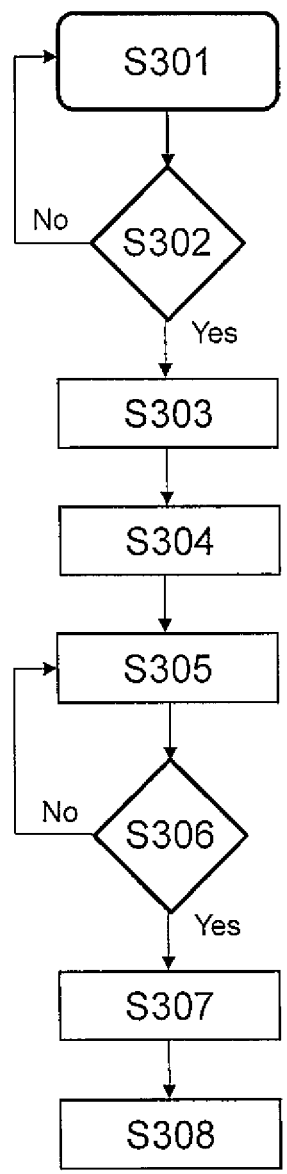
FIG. 3 is a schematic diagram of a procedure according to exemplary embodiment of the present invention.

FIG. 3 is a schematic diagram of a procedure according to exemplary embodiment of the present invention.

In S301, computer system is analysed to find common misconfigurations and vulnerability types known to exist. If, in S302, such applications or services are found that exhibit said vulnerabilities/misconfigurations, then S303 is entered. Otherwise, the computer system keeps on monitoring new vulnerabilities/misconfigurations in S301 and analysing the computer system. As new vulnerability types and/or misconfigurations are found, then the analysis of the computer system will be run again. The analysis may also take place periodically at predetermined intervals or every time new applications or services are introduced to the system.

In S303, any applications or services exhibiting said vulnerabilities/misconfigurations are stored in a database for further analysis/monitoring. In addition, the security application may provide a warning about the detected vulnerability/misconfiguration. The security application may also be configured to trigger an alarm if any modifications are done to said application by anything else than the application's own installer. In 8304, installation and normal operation of the application/services stored in the database are monitored to get "a baseline" of known expected behaviour of said applications/services. The security application creates and stores representations of the expected behaviours of the applications/services on the basis of the monitoring.

In S305, the behaviour of the computer system is monitored to detect one or more procedures of the monitored applications and/or services that do not match the expected behaviours of the monitored applications and services. In an embodiment, each procedure of the one or more procedures of the monitored applications and/or services is identified by a characteristic action and one or more expected actions. The characteristic and/or expected actions may include one or more of: API calls and/or API call parameters made by the running application, information made available to plugins of the running application, actions relating to browser extensions, file access operations performed by the running application, network operations performed by the running application, encrypted communications sent by the running application, error conditions relating to the running application. In an embodiment, the procedures may include any one or more of: establishment of a secure session, communication over a secure session, file operations, registry operations, memory operations, network operations.

In S306, if one or more procedures is detected not to match the expected behaviours of the monitored applications and services, S307 is entered where said application and/or service is identified as malicious or suspicious. In an embodiment, upon detection of one or more procedures not matching the expected behaviours, the method may further comprise analysing whether the detected one or more procedures match activities that are required to exploit said vulnerability types and/or misconfigurations and determining the severity of maliciousness of said application and/or service on the basis of the result of the analysis In S308, upon identifying said application and/or service as malicious or suspicious, the application and/or service is handled by one or more of: terminating a process of the application/service, terminating the characteristic action or an action resulting from the characteristic action, removing or otherwise making safe the application/service and performing a further malware scan on the application/service. In an embodiment, upon identifying the application/service as malicious or suspicious, the method further comprises at least one of: sending from a client computer to a server details of the characteristic action and other actions taken on the client computer; sending from the server to client computer an indication as to whether or not the application/service is malicious or suspicious; sending from the server to the client computer instructions for handling the application/service; prompting the client computer to kill and/or remove the application/service; storing information indicating the application/service. In an embodiment, an alert is triggered when detecting any operations on said applications/services that do not match "the baseline" and especially when said modifications match activities required to exploit a known vulnerability in said application.

For example, if a specific application is found to have an unquoted service path vulnerability, an alarm is given on any SC service queries in said application that are done by other than known system updater maintenance tools. Further, detection of any file creation operations having the same partial path as the specific application directory would trigger an alarm.

The method steps according to the invention may be created on the "back end", i.e. by a security service provider and provided to the security application at the client computer. A set of characteristic actions relating to suitable procedures, performed by an application or a service, may be specified and the application or service then analysed to determine characteristic and expected actions. The analysis may also include receiving behavioural monitoring information from each of a plurality of client computers on which the application has been running, and determining the characteristic and expected actions from the aggregated results of the behavioural monitoring.

Alternatively, at least part of the method steps may be performed at the client computer. The behaviour of the application/service may be monitored during normal use of the computer. In order to mitigate the risks of creating the profile at the client computer, the application may be subject to intensive behavioural analysis techniques while the representation of the expected behaviour of the application is being created.

As a further alternative, a behaviour profile may be created either at the client computer or the server by examining the binary code of the application/service. The code is examined to look for characteristic actions of interest, and to determine which expected actions would be associated with those characteristic actions.

Prior to performing any of the above analyses, the application may be identified as a known malware by comparing it to identification information of the malware. For example, the application may be compared to a hash of a known malicious application, or a digital signature of the application may be examined to determine whether it is valid or issued by a trusted source.

The behaviour monitoring and detection of characteristic and expected actions may be performed at the client computer or at the server. Alternatively, the client computer may monitor the behaviour of the suspect application, and send details of monitored actions to a server, along with identification information for the monitored application. The information may be sent periodically, or only when characteristic actions are detected (e.g. detecting an SSL connection may cause the client computer to send details of the behaviour leading up to the SSL connection to the server). The server maintains the database of the applications/services to be monitored, and detects characteristic actions (if not already detected by the client), and the expected action. The detection is carried out as described above. If the analysis identifies the application running on the client computer as malicious or suspicious, then the server notifies the client computer, and may specify a response to be performed.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of detecting a threat against a computer system, the method comprising:
   a) analysing the computer system to find any at least one of applications or services exhibiting common at least one of vulnerability types or misconfigurations known to exist;
   b) monitoring installation and normal operation of such found at least one of applications or services of the analysed computer system that are detected to exhibit said at least one of vulnerability types or misconfigurations;
   c) creating and storing representations of expected behaviors of monitored at least one of applications or services on the basis of the monitoring, comprising maintaining a respective behavior profile for each respective monitored at least one of applications or services, wherein the respective behavior profile identifies, for one or more procedures of the respective monitored at least one of application or services, a respective characteristic action and respective one or more expected actions for each of the respective monitored at least one of application or services;
   d) monitoring the behavior of the computer system to detect the one or more procedures of the monitored at least one of applications or services that do not match the expected behaviors of the respective monitored at least one of applications or services defined in the respective behavior profile; and
   e) upon detection of the one or more procedures not matching the expected behaviors of the monitored at least one of applications or services, identifying said at least one of applications or services as malicious or suspicious.

2. The method according to claim 1, the method further comprising determining said common at least one of vulnerability types or misconfigurations against the computer system by analysis and/or by receiving external security data feed having information on said common at least one of vulnerability types or misconfigurations.

3. The method according to claim 1, the method further comprising storing any found applications or services of the analysed computer system that are detected to exhibit said at least one of vulnerability types or misconfigurations in a database.

4. The method according to claim 1, upon detection of the one or more procedures not matching the expected behaviours, the method further comprises analysing whether the one or more procedures match activities that are required to exploit said common at least one of vulnerability types or misconfigurations and determining the severity of maliciousness of said at least one of applications or services on the basis of the result of the analysis.

5. The method according to claim 1, wherein each procedure of the one or more procedures of the respective monitored at least one of applications or services is identified by a characteristic action and one or more expected actions.

6. The method according to claim 5, wherein the characteristic and/or expected actions include one or more of: API calls and/or API call parameters made by the running application, information made available to plugins of the running application, actions relating to browser extensions, file access operations performed by the running application, network operations performed by the running application, encrypted communications sent by the running application, error conditions relating to the running application.

7. The method according to claim 1, wherein said procedures include any one or more of: establishment of a secure session, communication over a secure session, file operations, registry operations, memory operations, network operations.

8. The method according to claim 1, upon identifying said at least one of applications or services as malicious or suspicious, the method further comprises handling the at least one of applications or services by one or more of: terminating a process of the at least one of applications or services, terminating the characteristic action or an action resulting from the characteristic action, removing or otherwise making safe the at least one of applications or services and performing a further malware scan on the at least one of applications or services.

9. The method according to claim 1, upon identifying the at least one of applications or services as malicious or suspicious, further comprising at least one of:
   sending from a client computer to a server details of the characteristic action and other actions taken on the client computer; sending from the server to client computer an indication as to whether or not the at least one of applications or services is malicious or suspicious; or
   sending from the server to the client computer instructions for handling the at least one of applications or services; prompting the client computer to kill and/or remove the at least one of applications or services; storing information indicating the at least one of applications or services.

10. A computer system comprising:
   a memory configured to store computer program code, and
   a processor configured to read and execute computer program code stored in the memory,
   wherein the processor is configured to cause the computer system to perform:
   a) analysing the computer system to find any at least one of applications or services exhibiting common at least one of vulnerability types or misconfigurations known to exist;
   b) monitoring installation and normal operation of such found at least one of applications or services of the analysed computer system that are detected to exhibit said common at least one of vulnerability types or misconfigurations;

c) creating and storing representations of expected behaviors of the monitored at least one of applications or services on the basis of the monitoring, comprising maintaining a respective behavior profile for each respective monitored at least one of applications or services, wherein the respective behavior profile identifies, for one or more procedures of the respective monitored at least one of applications or services, a respective characteristic action and respective one or more expected actions for each of the monitored at least one of applications or services;

d) monitoring the behavior of the computer system to detect the one or more procedures of the monitored at least one of applications or services that do not match the expected behaviors of the respective monitored at least one of applications or services defined in the respective behavior profile; and upon detection of the one or more procedures not matching the expected behaviors of the monitored at least one of applications or services, identifying said at least one of applications or services as malicious or suspicious.

11. The system according to claim 10, wherein the processor is further configured to cause system to perform: determining said at least one of common vulnerability types or misconfigurations against the computer system by analysis and/or by receiving external security data feed having information on said common at least one of vulnerability types or misconfigurations.

12. The system according to claim 10, wherein the processor is further configured to cause the system to perform: storing any found at least one of applications or services of the analysed computer system that are detected to exhibit said common at least one of vulnerability types or misconfigurations in a database.

13. The system according to claim 10, upon detection of the one or more procedures not matching the expected behaviours, the processor is further configured to cause the system to perform analysing whether the one or more procedures match activities that are required to exploit said at least one of vulnerability types or misconfigurations and determining the severity of maliciousness of said at least one of applications or services on the basis of the result of the analysis.

14. The system according to claim 10, wherein each procedure of the one or more procedures of the monitored at least one of applications and services is identified by a characteristic action and one or more expected actions.

15. The system according to claim 14, wherein the characteristic and/or expected actions include one or more of: API calls and/or API call parameters made by the running application, information made available to plugins of the running application, actions relating to browser extensions, file access operations performed by the running application, network operations performed by the running application, encrypted communications sent by the running application, error conditions relating to the running application.

16. The system according to claim 10, wherein said procedures include any one or more of: establishment of a secure session, communication over a secure session, file operations, registry operations, memory operations, network operations.

17. The system according to claim 10, upon identifying said at least one of applications or services as malicious or suspicious, the processor is further configured to cause the system to perform handling the at least one of applications or services by one or more of: terminating a process of the at least one of applications or services, terminating the characteristic action or an action resulting from the characteristic action, removing or otherwise making safe the at least one of applications or services and performing a further malware scan on the at least one of applications or services.

18. The system according to claim 10, upon identifying said at least one of applications or services as malicious or suspicious, the processor is further configured to cause the system to perform at least one of: sending from a client computer to a server details of the characteristic action and other actions taken on the client computer; sending from the server to client computer an indication as to whether or not the at least one of applications or services is malicious or suspicious; sending from the server to the client computer instructions for handling the at least one of applications or services; prompting the client computer to kill and/or remove the at least one of applications or services; storing information indicating the at least one of applications or services.

19. A non-transitory computer storage medium of a computer system having stored thereon computer program code for implementing a) analysing the computer system to find any at least one of applications or services exhibiting common at least one of vulnerability types or misconfigurations known to exist;

b) monitoring installation and normal operation of such found at least one of applications or services of the analysed computer system that are detected to exhibit said at least one of vulnerability types or misconfigurations;

c) creating and storing representations of expected behaviors of monitored at least one of applications or services on the basis of the monitoring, comprising maintaining a respective behavior profile for each respective monitored at least one of applications or services, wherein the respective behavior profile identifies, for one or more procedures of the respective monitored at least one of applications or services, a respective characteristic action and respective one or more expected actions for each of the respective monitored at least one of applications or services;

d) monitoring the behavior of the computer system to detect the one or more procedures of the monitored at least one of applications or services that do not match the expected behaviors of the respective monitored at least one of applications or services defined in the respective behavior profile; and e) upon detection of the one or more procedures not matching the expected behaviors of the respective monitored at least one of applications or services, identifying said at least one of applications or services as malicious or suspicious.

* * * * *